UNITED STATES PATENT OFFICE.

JOHN C. SLACK, OF CLAYTON, TERRITORY OF NEW MEXICO.

PROCESS OF MAKING A MEDICINAL COMPOSITION.

No. 888,758.

Specification of Letters Patent.

Patented May 26, 1908.

Application filed July 12, 1907. Serial No. 383,480.

*To all whom it may concern:*

Be it known that I, JOHN C. SLACK, a citizen of the United States, residing at Clayton, in the county of Union and Territory of New Mexico, have invented certain new and useful Improvements in a Process of Making a Medicinal Composition, of which the following is a specification.

My invention is a new composition of matter for the treatment of catarrh and for purifying the blood.

My composition consists of several ingredients having healing and curative properties, combined with a preparation made from the plant *Artemisia frigida* also known as mountain sage and as *Sierra salvia*. This plant is a powerful tonic and alterative, and in making the above named preparation I take both the roots and the top parts of the plant, burn them to ashes and then mix the ashes with grain alcohol in the proportion of one half gallon of alcohol to each gallon of ashes. This mixture or preparation is then percolated or strained and combined with the following ingredients in the proportion stated, viz:

| | |
|---|---|
| Alcoholic extract of the ash of *Artemisia frigida* | 24 grains |
| Iodin | 8 grains |
| Iodid of potash | 12 grains |
| Glycerin | 24 grains |
| Distilled water | 412 grains |

These ingredients are thoroughly mingled by agitation and they produce a wine colored preparation free from sediment which is exceedingly effective in the treatment of catarrh in all of its forms and which is excellent as a blood purifier and system renovater. As above stated the plant *Artemisia frigida* is a powerful tonic and alterative, while the iodid of potash is used for softening the inflamed tissues and the removal of exudations, and the iodin is used as a general excitant of the vital actions of the absorbent and glandular systems. The alcohol is used simply to prepare the *Artemisia frigida* and the glycerin is used as an assistant in combining the above named ingredients.

The composition is taken internally immediately after meals and the usual dose for an adult is one teaspoonful in a glass full of water. The dose for children from 4 to 8 years of age is from 5 to 15 drops in a little water and for children from 8 to 12 years from 10 to 30 drops in a wine glass full of water. It should never be taken upon an empty stomach.

I claim:

The herein described process, of making a medicinal composition for the treatment of catarrh, consisting in burning the entire plant *Artemisia frigida*, forming an alcoholic extract of the resultant ash and mixing therewith iodin, potassium iodid, glycerin and water, substantially as described.

In testimony whereof I hereunto affix my signature in the presence of two witnesses.

JOHN C. SLACK.

Witnesses:
 CLAUDE F. DALY,
 F. P. TIERNEY.